(12) United States Patent
Song

(10) Patent No.: US 6,830,343 B2
(45) Date of Patent: Dec. 14, 2004

(54) PROJECTOR APPARATUS

(75) Inventor: Pei-Lun Song, Taouyan (TW)

(73) Assignee: BenQ Corporation, Taoyuan (TW)

( * ) Notice: Subject to any disclaimer, the term of this patent is extended or adjusted under 35 U.S.C. 154(b) by 0 days.

(21) Appl. No.: 10/663,250

(22) Filed: Sep. 15, 2003

(65) Prior Publication Data

US 2004/0057022 A1 Mar. 25, 2004

(30) Foreign Application Priority Data

Sep. 19, 2002 (TW) .......................... 91121422 A

(51) Int. Cl.$^7$ .......................................... G03B 21/14
(52) U.S. Cl. ........................ 353/84; 353/31; 348/743
(58) Field of Search ..................... 353/31, 84; 348/742, 348/743, 771

(56) References Cited

U.S. PATENT DOCUMENTS 5,650,832 A * 7/1997 Poradish et al. ............ 348/743
6,520,644 B1 * 2/2003 Lee ............................. 353/31
2002/0109821 A1 * 8/2002 Huibers et al. .............. 353/84
2004/0008288 A1 * 1/2004 Pate et al. ................... 348/742

* cited by examiner

Primary Examiner—William C. Dowling
(74) Attorney, Agent, or Firm—Snell & Wilmer L.L.P.

(57) ABSTRACT

The present invention is a color wheel and a projector apparatus using the same. The projector apparatus includes a lamp, a color wheel, and a driving device. The lamp generates a beam directing into the color wheel. The driving device drives the color wheel to rotate, to radially move, or to axially move. The color wheel includes a plurality of filter devices. At least one filter device includes a first filter and a white filter connected to the first filter. A boundary arc is defined at the connection of the first filter and the white filter. The ratio of the area of the first filter to the area of the white filter for each filter device is predetermined, and the ratios among the filter devices are selectively the same.

20 Claims, 5 Drawing Sheets

US 6,830,343 B2

PROJECTOR APPARATUS

CROSS REFERENCE TO RELATED APPLICATIONS

This application claims priority of Taiwan Patent Application Serial No. 091121422 filed on Sep. 19, 2002.

FIELD OF INVENTION

The present invention relates to a projector apparatus, and especially to a projector apparatus with a color wheel for filtering the light beam.

BACKGROUND OF THE INVENTION

The full color display systems of today generally form images by combining three projected primary colors, namely red, green, and blue, to become a full color image to the eyes of the viewers. Therefore, images are typically formed with three separate optical modules.

The image display systems selectively use spatial light modulators or cathode ray tubes as optical modules. The spatial light modulators provide higher resolution and occupy smaller space than the cathode ray tubes. Digital micro-mirror device is an example of spatial light modulators and is often used in direct-view or projection-type displays.

The digital micro-mirror device consists of hundreds or thousands of micro mirror arrays, and one mirror corresponds to one image pixel. With the aid of digital micro-mirror device array and proper filters, the image display system may form images consisting of three primary colors by single light source. Using light sources and three cathode ray tubes as modulators may also form the images consisting of three primary colors.

The spatial light modulators adopt sequential color filters to form color images. All image pixels are formed by light respectively filtrated by the filters. Such display systems typically use color wheel having red, green, and blue filters as sequential color filter to form full color images. Therefore, light is filtrated by the color wheel to become corresponding colors and projected into the spatial light modulator to form every image pixels.

Typical color wheels are disk-type color wheels with a plurality of filters. However, there are other options, e.g. rotatable drum-type or polygonal color wheel. While projecting into the color wheel, the white light beam is filtrated by the filters to become light beam of one of the three primary colors. The color wheel includes at least one filter for each primary color.

Typically, the rotation speed of the color wheel should be high enough allowing at least one primary color image to create persistence. Color wheels with higher rotation speed or more filters may moderate undesired discontinuity of output image.

The three primary color lights combine to become white light. But such combined white light is not bright enough for data-type images. To this end, color wheels with red, green, blue, and white are devised. However, such color wheel cannot produce film-type images of naturalism.

The U.S. Pat. No. 5,650,832 discloses a method for generating light beams with different brightness and saturation. As shown in FIG. 5, the light beam is adjusted to project into different spots 51, 52, and 53 of the conventional three-color color wheel 500 to generate light beams with different brightness and saturation. However, optical path difference exists between filtrated color light beam and non-filtrated white light beam. Furthermore, the mix-ratio of filtrated color light beam to non-filtrated white light beam is constant as the projection spot is fixed, thus not allowing minor adjustment to meet different needs.

SUMMARY OF THE INVENTION

One aspect of the present invention provides a projector apparatus allowing brightness adjustment of output image.

The projector apparatus includes a lamp, a color wheel, a driving device, and a light pipe. The lamp generates the light beam. The color wheel filters the light beam. The driving device is connected to the color wheel and selectively drives the color wheel to rotate, to radially move, or to axially move. The light pipe propagates the light beam.

The color wheel is selectively disk-type or barrel-type and has three, but not limited to three, filter devices. At least one filter device includes a first filter and a white filter connected to the first filter. In one embodiment, the first filters are respectively red, green, and blue filters. A boundary arc is defined at the connection of the first filter and the white filter. Besides, ratio of the area of the first filter to the area of the white filter for each filter device is predetermined, and ratios among the filter devices are selectively the same. The white filter is a transparent filter having the same refraction index as the first filter.

While the driving device drives the color wheel to rotate, the light beam projects into every filter devices sequentially. As the color wheel is a disk-type color wheel, the driving device may drive the color wheel to move radially for allowing the light beam to project into the first filter, the white filter, or onto the boundary arc. As the light beam passes the first filter, the filtrated light beam respectively becomes red, green, or blue light. While passing through the first filter, the white filter, and the boundary arc, the light beam is filtrated simultaneously by the first filter and the white filter. Therefore, the filtrated light beam becomes a combination of white light and red, green, or blue light respectively. Light filtrated this way has higher brightness.

The advantage and spirit of the present invention may be further comprehended through the following detailed description and attached drawings.

DETAILED DESCRIPTION

Figure 1A:
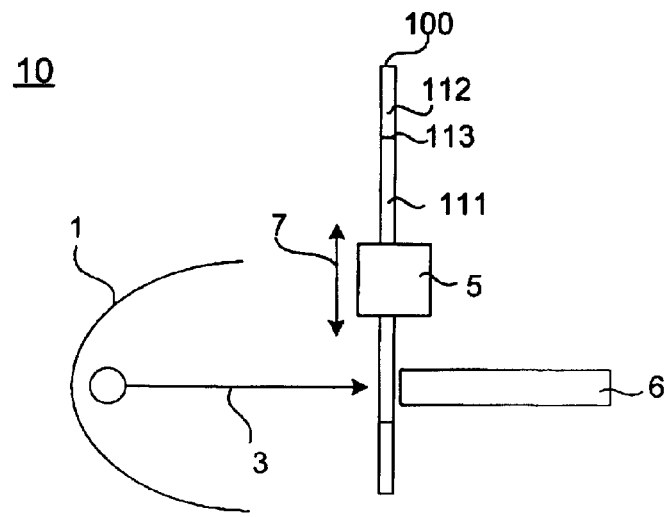
FIG. 1a and FIG. 1b are schematic diagrams of a first exemplary embodiment.

The present invention relates to a color wheel and a projector apparatus using the color wheel. FIG. 1a and FIG.

1b are schematic diagrams of a first exemplary embodiment. The projector apparatus 10, such as a digital micro-mirror projector device, includes a lamp 1, a color wheel 100, a driving device 5, and a light pipe 6. The lamp 1 generates the light beam 3. The color wheel 100 filters the light beam 3. The driving device 5 is connected to the color wheel 100 and selectively drives the color wheel 100 to radially move in the direction 7 or to rotate. The color wheel 100 has a rotation center. The light pipe 6 propagates the light beam 3.

Figure 1B:
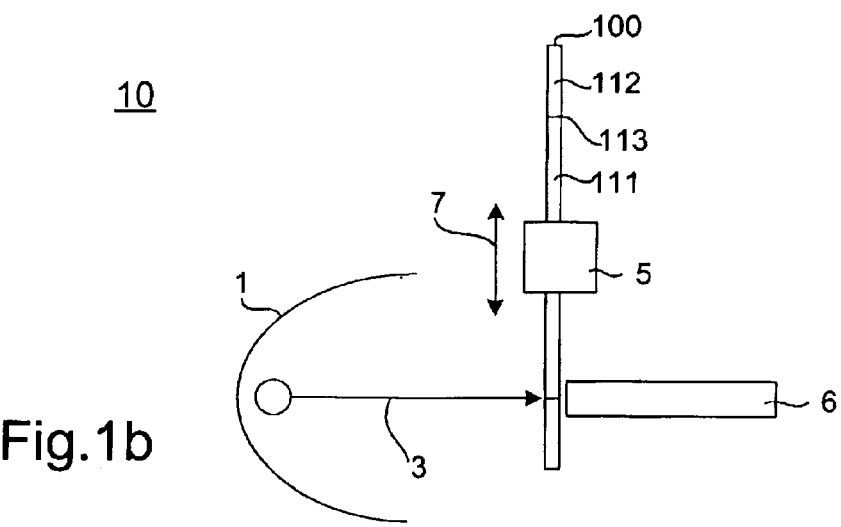
Figure 1C:
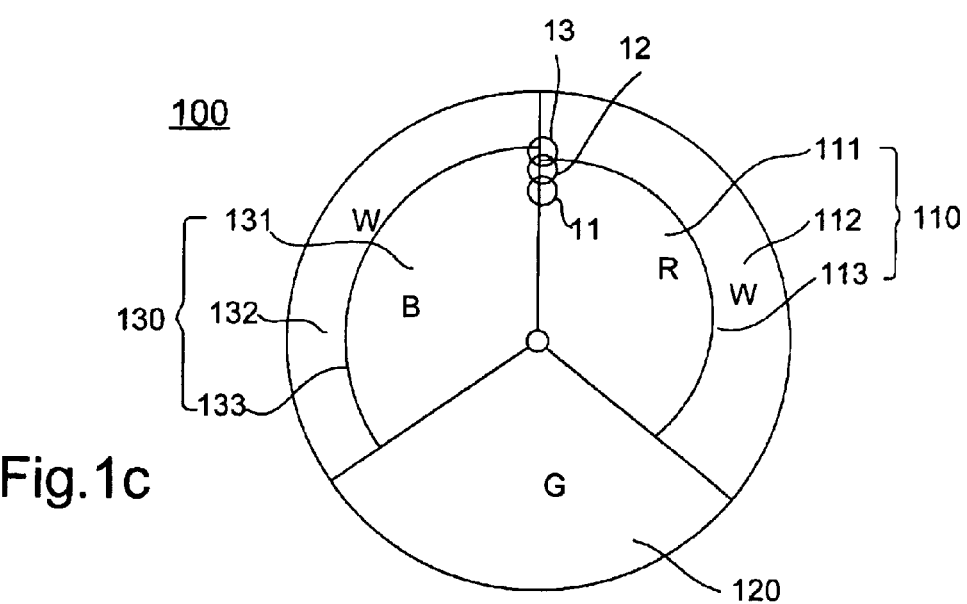
FIG. 1c is a schematic diagram of a color wheel according to the first exemplary embodiment.

The color wheel 100 includes a plurality of filter devices 110, as shown in FIG. 1c. At least one filter device 110 includes a first filter 111 and a white filter 112 connected to the first filter 111. A boundary arc 113 is defined at the connection of the first filter 111 and the white filter 112. The boundary arc 113 has a center of curvature near the rotation center. The white filter 112 is a transparent filter with the same refraction index as the first filter 111. Besides, ratio of the area of the first filter 111 to the area of the white filter 112 for each filter device 110 is a predetermined ratio, and each predetermined ratios can be the same as or different from one another. As the light beam 3 passes the first filter 111, the filtrated light beam 3 becomes the color of the first filter 111. While passing the first filter 111, the white filter 112, and the boundary arc 113, the light beam 3 is filtrated simultaneously by the first filter 111 and the white filter 112. Therefore, the filtrated light beam 3 becomes a combination of white light and the color light filtrated by the first filter 111. Light filtrated in this way has higher brightness.

FIG. 1c is a schematic diagram of the color wheel 100 according to the first exemplary embodiment. The color wheel 100 is disk-type and has three, but not limited to three, filter devices 110, 120 and 130. The filter device 110 includes a first filter 111 and a white filter 112 connected to the first filter 111. A boundary arc 113 is defined at the connection of the first filter 111 and the white filter 112. The filter device 130 includes a first filter 131 and a white filter 132 connected to the first filter 131. A boundary arc 133 is defined at the connection of the first filter 131 and the white filter 132. Besides, predetermined area ratios among the filter devices 110 and 130 are not the same. As shown in FIG. 1, the area of the first filter 131 is larger than the area of another first filter 111. Therefore, the area of the white filter 132 is smaller than the area of another white filter 112.

As the driving device 5 drives the color wheel 100 to rotate, the light beam 3 sequentially projects into filter devices 110, 120, and 130. As the driving device 5 drives the color wheel 100 to move radially, the light beam 3 selectively projects into the filters or onto the boundary arcs. The first filter 111, the filter device 120, the first filter 131 are respectively red, green, and blue filters.

For example, as shown in FIG. 1c, as the light beam 3 projects into the color wheel 100 at the spot 11, the light beam 3 projects respectively into the first filter 111, the filter device 120, and the first filter 131. Therefore the filtrated light beam 3 respectively becomes red light with brightness A, green light with brightness B, and blue light with brightness C. As the light beam 3 projects into the color wheel 100 at the spot 12, the light beam 3 projects respectively onto the boundary arc 113, into the filter device 120, and into the first filter 131. Therefore, the filtrated light beam 3 respectively becomes red light with brightness A', green light with unchanged brightness B, and blue light with unchanged brightness C. As the light beam 3 projects into the color wheel 100 at the spot 13, the light beam 3 projects respectively onto the boundary arc 113, into the filter device 120, and onto the boundary arc 133. Therefore the filtrated light beam 3 respectively becomes red light with brightness A", green light with unchanged brightness B, and blue light with brightness C'. Here A">A'>A for red light, C'>C for blue light. The exemplary embodiments allow the user to choose preferred brightness.

Figure 2A:
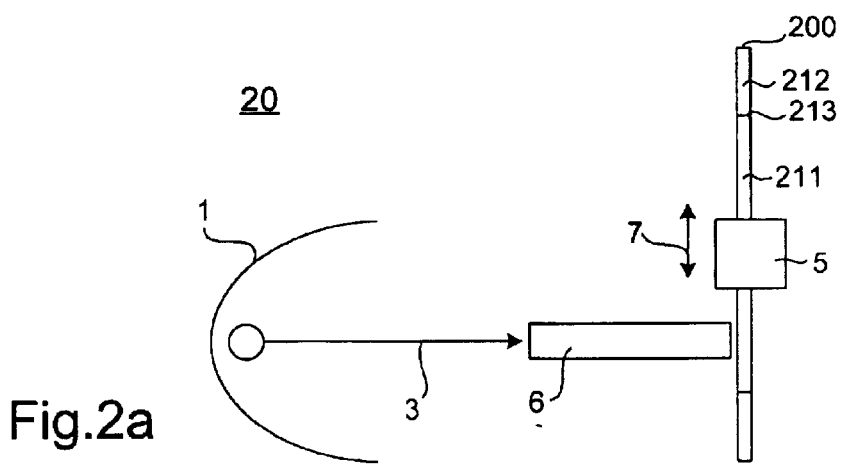
FIG. 2a and FIG. 2b are schematic diagrams of a second exemplary embodiment.
Figure 2B:
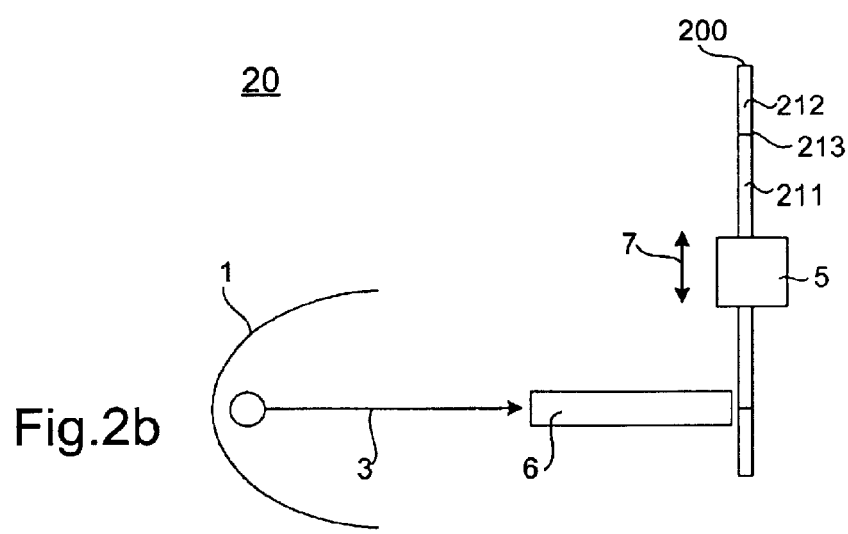
Figure 2C:
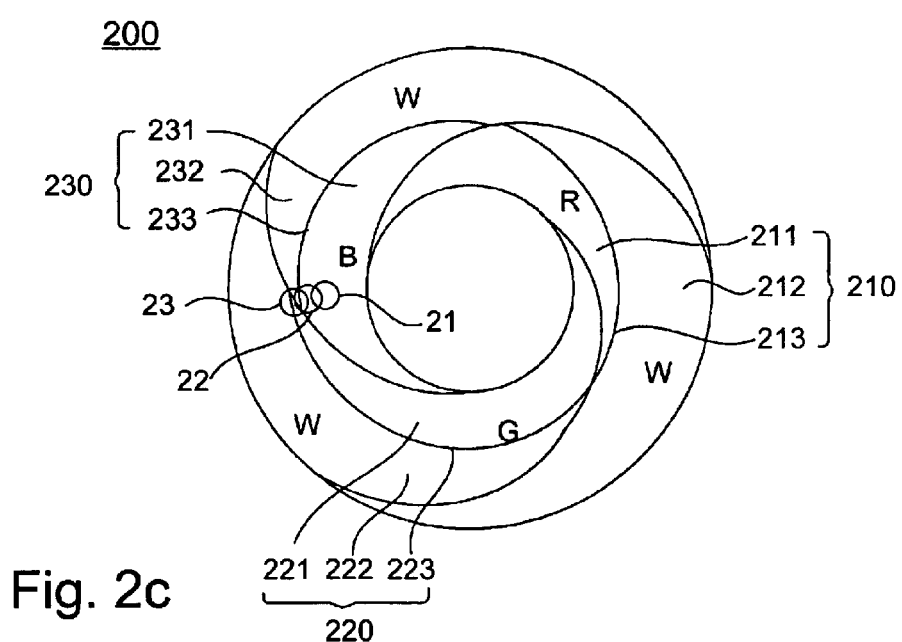
FIG. 2c is a schematic diagram of a color wheel according to the second exemplary embodiment.

FIG. 2a and FIG. 2b are schematic diagrams of a second exemplary embodiment. Being similar to the first exemplary embodiment, the projector apparatus 20 includes a lamp 1, a color wheel 200, a driving device 5, and a light pipe 6. But the filter devices of the disk-type color wheel 200 are turbofan-shaped, as shown in FIG. 2c. The position of light pipe 6 is adjusted due to the change of the color wheel 200. The light beam 3 is emitted from the lamp 1, propagated by the light pipe 6, and then projects into the color wheel 200, as shown in FIG. 2a and FIG. 2b.

FIG. 2c is a schematic diagram of a color wheel according to the second exemplary embodiment. The color wheel 200 has three, but not limited to three, filter devices 210, 220 and 230. The filter device 210 includes a first filter 211 and a white filter 212 connected to the first filter 211. A boundary arc 213 is defined at the connection of the first filter 211 and the white filter 212. The filter device 220 includes a first filter 221 and a white filter 222 connected to the first filter 221. A boundary arc 223 is defined at the connection of the first filter 221 and the white filter 222. The filter device 230 includes a first filter 231 and a white filter 232 connected to the first filter 231. A boundary arc 233 is defined at the connection of the first filter 231 and the white filter 232. Besides, predetermined area ratios among the filter devices 210, 220, and 230 are not the same. As shown in FIG. 2, the area of the first filter 231 is larger than areas of another two first filters 211 and 221. Therefore the area of the white filter 232 is smaller than the areas of another two white filters 212 and 222.

Similarly, as the driving device 5 drives the color wheel 200 to rotate, the light beam 3 respectively projects into filter devices 210, 220, and 230. As the driving device 5 drives the color wheel 200 to move radially, the light beam 3 selectively projects into the first filters, as shown in FIG. 2a, or onto the boundary arcs, as shown in FIG. 2b.

For example, as shown in FIG. 2c, as the light beam 3 projects into the color wheel 200 at the spot 21, the light beam 3 projects respectively into the first filters 211, 221, and 231, which respectively are red, green, and blue filters. Therefore the filtrated light beam 3 respectively becomes red light with brightness a, green light with brightness b, and blue light with brightness c. As the light beam 3 projects into the color wheel 200 at the spot 22, the light beam 3 projects respectively into the first filters 211, 221, and onto the boundary arc 233. Therefore the filtrated light beam 3 respectively becomes red light with unchanged brightness a, green light with unchanged brightness b, and blue light with brightness c'. As the light beam 3 projects into the color wheel 200 at the spot 23, the light beam 3 projects respectively onto the boundary arcs 213, 223, and 233. Therefore the filtrated light beam 3 respectively becomes red light with brightness a', green light with brightness b', and blue light with brightness c". Here a'>a, b'>b, and c">c'>c.

Figure 3A:
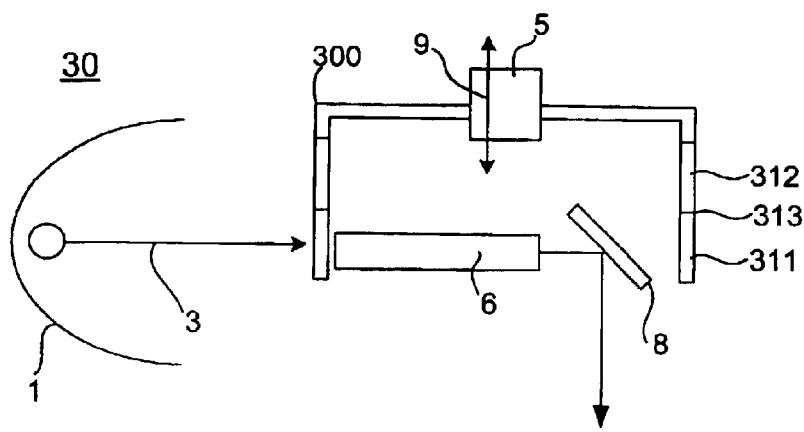
FIG. 3a and FIG. 3b are schematic diagrams of a third exemplary embodiment.
Figure 3B:
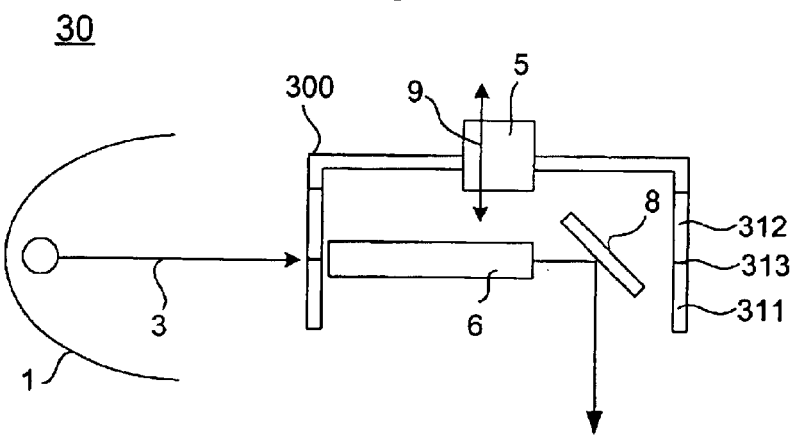

FIG. 3a and FIG. 3b are schematic diagrams of a third exemplary embodiment. The color wheel 300 is barrel-type, different from the first and second exemplary embodiments. The projector apparatus 30 includes a lamp 1, a color wheel 300, a driving device 5, a light pipe 6, and a reflector 8. The lamp 1 generates light beam 3. The color wheel 300 filters the light beam 3. The driving device 5 is connected to the color wheel 300 and selectively drives the color wheel 300 to axially move in direction 9 or to rotate. The color wheel 300 has a rotation center. The light pipe 6 propagates the light beam 3. And the reflector 8 changes the propagation direction of the light beam 3.

Figure 3C:
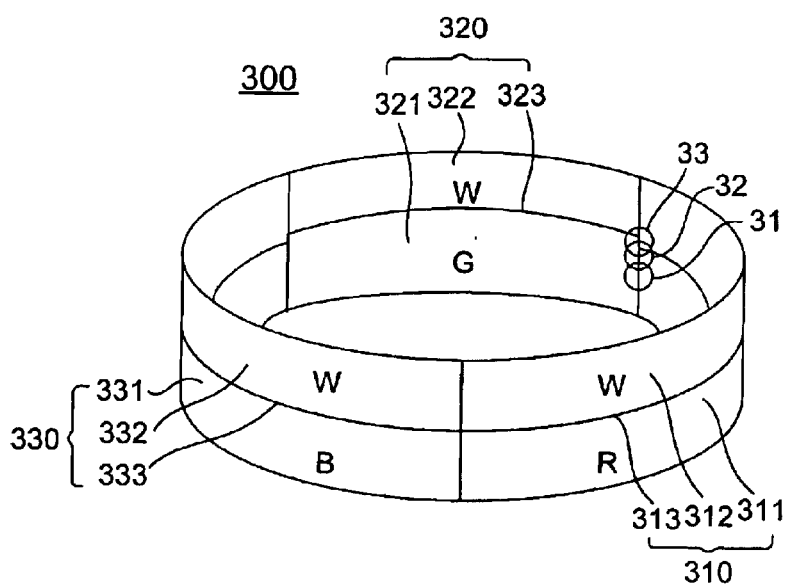
FIG. 3c is a schematic diagram of a color wheel according to the third exemplary embodiment.

FIG. 3c is a schematic diagram of a color wheel according to the third exemplary embodiment. The color wheel 300 has three, but not limited to three, filter devices 310, 320, and 330. The filter device 310 includes a first filter 311 and a white filter 312 connected to the first filter 311. A boundary arc 313 is defined at the connection of the first filter 311 and the white filter 312. The filter device 320 includes a first filter 321 and a white filter 322 connected to the first filter 321. A boundary arc 323 is defined at the connection of the first filter 321 and the white filter 322. The filter device 330 includes a first filter 331 and a white filter 332 connected to the first filter 331. A boundary arc 333 is defined at the connection of the first filter 331 and the white filter 332. The boundary arcs 313, 323, and 333 have centers of curvature near the rotation center. Besides, predetermined area ratios among the filter devices 310, 320, and 330 are not the same. As shown in FIG. 3c, the area of the first filter 321 is larger than areas of another two first filters 311 and 331. Therefore the area of the white filter 322 is smaller than the areas of another two white filters 312 and 332.

As the driving device 5 drives the color wheel 300 to rotate, the light beam 3 respectively projects into filter devices 310, 320, and 330. As the driving device 5 drives the color wheel 300 to move axially, the light beam 3 selectively projects into the first filters, as shown in FIG. 3a, or onto the boundary arcs, as shown in FIG. 3b. The first filters 311, 321, and 331 are respectively red, green, and blue filters.

For example, as shown in FIG. 3c, as the light beam 3 projects into the color wheel 300 at the spot 31, the light beam 3 projects respectively into the first filters 311, 321, and 331. Therefore, the filtrated light beam 3 respectively becomes red light with brightness X, green light with brightness Y, and blue light with brightness Z. As the light beam 3 projects into the color wheel 300 at the spot 32, the light beam 3 projects respectively onto the boundary arcs 313, 333, and into the first filter 321. Therefore, the filtrated light beam 3 respectively becomes red light with brightness X', green light with unchanged brightness Y, and blue light with brightness Z'. As the light beam 3 projects into the color wheel 300 at the spot 33, the light beam 3 projects respectively onto the boundary arcs 313, 323, and 333. Therefore, the filtrated light beam 3 respectively becomes red light with brightness X", green light with brightness Y', and blue light with brightness Z". Here X">X'>X, Y'>Y, and Z">Z'>Z.

Figure 4A:
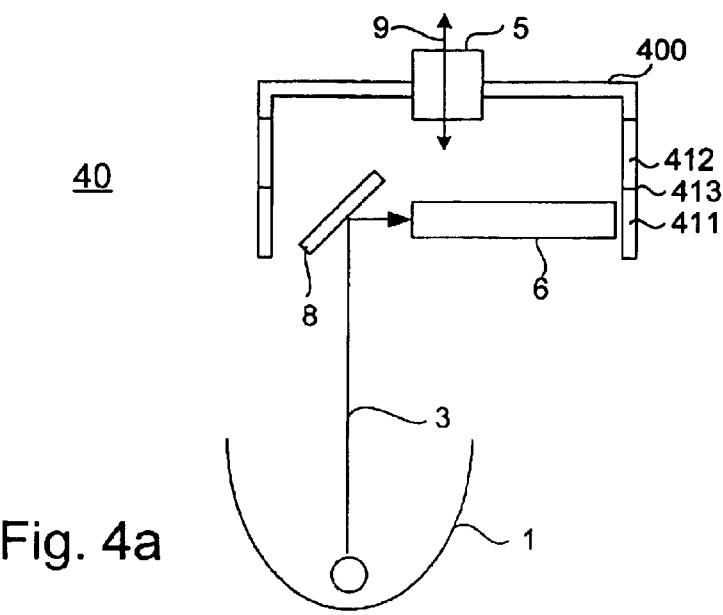
FIG. 4a and FIG. 4b are schematic diagrams of a fourth exemplary embodiment.
Figure 4B:
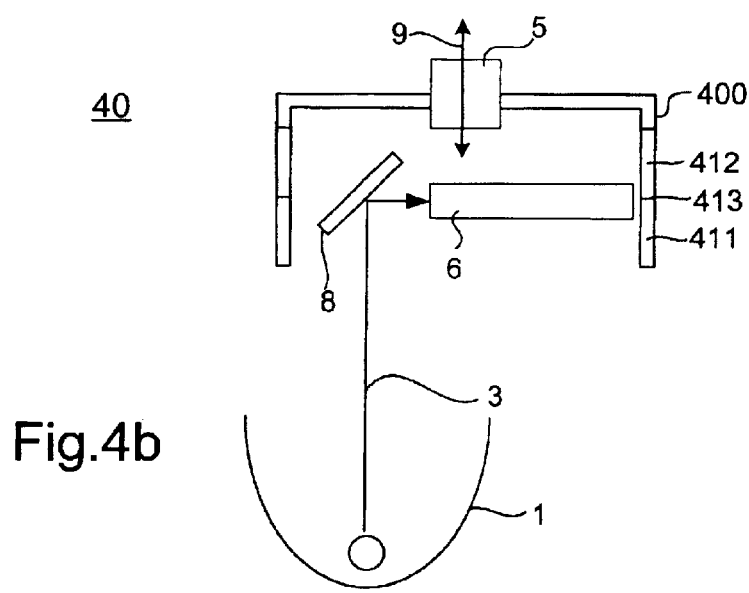
Figure 4C:
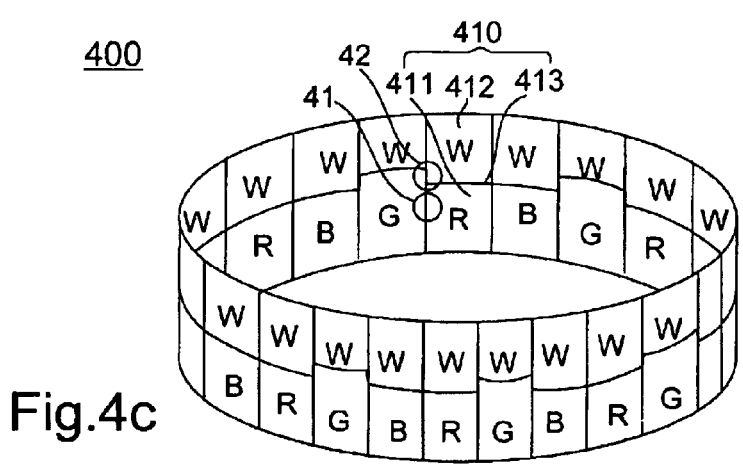
FIG. 4c is a schematic diagram of a color wheel according to the fourth exemplary embodiment.
Figure 5:
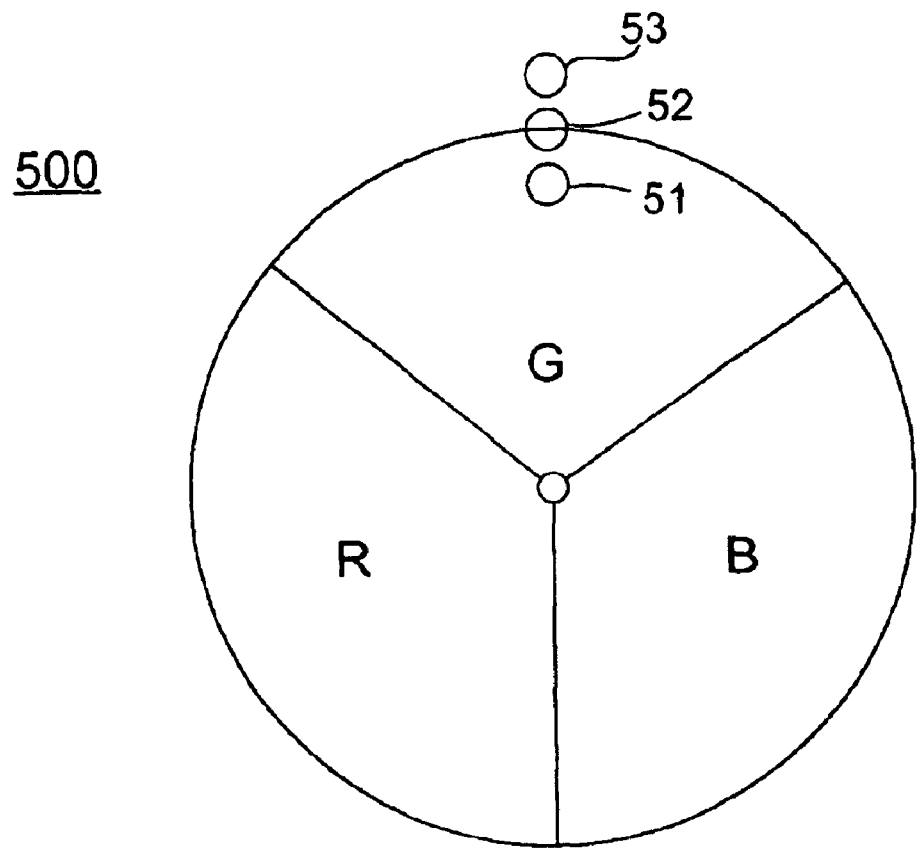
FIG. 5 is a schematic diagram of a color wheel according to the prior art.

FIG. 4a and FIG. 4b are schematic diagrams of a fourth exemplary embodiment. Being similar to the third exemplary embodiment, the projector apparatus 40 includes a lamp 1, a color wheel 400, a driving device 5, a light pipe 6, and a reflector 8. The color wheel 400 includes more filter devices 410 than the third exemplary embodiment, as shown in FIG. 4c. The position of light pipe 6 is adjusted due to the change of the color wheel 400, as shown in FIG. 4a and FIG. 4b. The light beam 3 is emitted from the lamp 1, reflected by the reflector 8, propagated by the light pipe 6, and then projects into the color wheel 400.

As shown in FIG. 4c, the color wheel 400 includes a plurality of filter devices 410. As the driving device 5 drives the color wheel 400 to rotate, the light beam 3 projects into filter devices 410. As the driving device 5 drives the color wheel 400 to move axially, the light beam 3 selectively projects into the first filters 411, as shown in FIG. 4a, or onto the boundary arcs 413, as shown in FIG. 4b.

For example, as shown in FIG. 4c, as the light beam 3 projects into the color wheel 400 at the spot 41, the light beam 3 projects respectively into the first filters 411. Therefore, the filtrated light beam 3 respectively becomes red light with brightness x, green light with brightness y, and blue light with brightness z. As the light beam 3 projects into the color wheel 400 at the spot 42, the filtrated light beam 3 respectively becomes red light with brightness x', green light with brightness y', and blue light with brightness z'. Here x'>x, y'>y, and z'>z.

While this invention has been described with reference to the illustrative embodiments, these descriptions are not is intended to be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

I claim:

1. A projector apparatus, comprising:
   a color wheel, said color wheel having a rotation center and including multiple filter devices, wherein at least one said filter device includes a first filter and a white filter connected to said first filter, a boundary arc is defined at the connection of said first filter and said white filter, said boundary arc has a center of curvature near said rotation center; and
   a lamp for generating a light beam;
      wherein as said color wheel is rotated, said light beam projects into each said first filter, said white filter, and said boundary arc selectively to filter said light beam.

2. The projector apparatus of claim 1, wherein a ratio of the area of said first filter to an area of said white filter for each filter device is a predetermined ratio, and the predetermined ratio corresponding to one filter device is the same as or different from a ratio of a different filter device.

3. The projector apparatus of claim 1, wherein said light beam is filtered to become a first color light of a first brightness as said light beam passes said first filter, and said light beam is filtered to become said first color light of a second brightness as said light beam passes said white filter and said boundary arc, wherein color of said first color light is non-white, said first brightness is smaller than said second brightness.

4. The projector apparatus of claim 1, further comprising a driving device for selectively driving said color wheel to rotate, to radially move, and to axially move.

5. The projector apparatus of claim 4, wherein said color wheel is a disk-type color wheel, said disk-type color wheel moves radially for selectively allowing said light beam to project into said first filter, said white filter, and said boundary arc.

6. The projector apparatus of claim 1, comprising a digital micro-mirror projector device.

7. The projector apparatus of claim 1, comprising a liquid-crystal-on-silicon device.

8. A projector apparatus, comprising:
   a color wheel, said color wheel having a rotation center and including multiple filter devices, wherein at least one said filter device includes a first filter and a white filter connected to said first filter, a boundary arc is defined at the connection of said first filter and said white filter, said boundary arc has a center of curvature near said rotation center, wherein a ratio of the area of said first filter to the area of said white filter for each filter device is a predetermined ratio and the predetermined ratio corresponding to one filter device is the same as or different from a ratio of a different filter device; and a lamp for generating a light beam;

wherein as said color wheel is rotated, said light beam projects into each said first filter, said white filter, and said boundary arc selectively to filter said light beam.

9. The projector apparatus of claim 8, said light beam is filtered to become a first color light of a first brightness as said light beam passes said first filter, and said light beam is filtered to become said first color light of a second brightness as said light beam passes said white filter and said boundary arc, wherein the color of said first color light is non-white and said first brightness is smaller than said second brightness.

10. The projector apparatus of claim 8, further comprising a driving device for selectively driving said color wheel to rotate, to radially move, and to axially move.

11. The projector apparatus of claim 10, wherein said color wheel is a disk-type color wheel, said disk-type color wheel moves radially for selectively allowing said light beam to project into said first filter, said white filter, and said boundary arc.

12. The projector apparatus of claim 8, comprising a digital micro-mirror projector device.

13. The projector apparatus of claim 8, comprising a liquid-crystal-on-silicon device.

14. A digital micro-mirror projector device, comprising:
a color wheel, said color wheel having a rotation center and including multiple filter devices, wherein at least one said filter device includes a first filter and a white filter connected to said first filter, a boundary arc is defined at the connection of said first filter and said white filter, said boundary arc has a center of curvature near said rotation center, wherein a ratio of the area of said first filter to the area of said white filter for each filter device is a predetermined ratio, and the predetermined ratio corresponding to one filter device is the same as or different from a ratio of a different filter device; and
a lamp for generating a light beam;
wherein as said color wheel is rotated, said light beam projects into each said first filter, said white filter, and said boundary arc selectively to filter said light beam, said light beam is filtered to become a first color light of a first brightness as said light beam passes said first filter, and said light beam is filtered to become said first color light of a second brightness as said light beam passes said white filter and said boundary arc, wherein the color of said first color light is non-white and said first brightness is smaller than said second brightness.

15. The digital micro-mirror projector device of claim 14, further comprising a driving device for selectively driving said color wheel to rotate, to radially move, and to axially move.

16. The digital micro-mirror projector device of claim 15, wherein said color wheel is a disk-type color wheel, said disk-type color wheel moves radially for selectively allowing said light beam to project into said first filter, said white filter, and said boundary arc.

17. The projector apparatus of claim 4, wherein said color wheel is a barrel-type color wheel, said barrel-type color wheel moves axially for selectively allowing said light beam to project into said first filter, said white filter, and said boundary arc.

18. The projector apparatus of claim 10, wherein said color wheel is a barrel-type color wheel, said barrel-type color wheel moves axially for selectively allowing said light beam to project into said first filter, said white filter, and said boundary arc.

19. The digital micro-mirror projector device of claim 15, wherein said color wheel is a barrel-type color wheel, said barrel-type color wheel moves axially for selectively allowing said light beam to project into said first filter, said white filter, and said boundary arc.

20. The projector apparatus of claim 1, wherein ratio of the area of said first filter to the area of said white filter for each filter device is a predetermined ratio, and the predetermined ratio corresponding to one filter device is the same as those to the other filter devices.

* * * * *